US008877841B2

(12) United States Patent
Yano et al.

(10) Patent No.: US 8,877,841 B2
(45) Date of Patent: Nov. 4, 2014

(54) MOLDING MATERIAL CONTAINING UNSATURATED POLYESTER RESIN AND MICROFIBRILLATED PLANT FIBER

(75) Inventors: Hiroyuki Yano, Uji (JP); Akihiro Sato, Kyoto (JP); Antonio Norio Nakagaito, Uji (JP); Fumiaki Nakatsubo, Kyoto (JP)

(73) Assignees: Kyoto University, Kyoto-shi (JP); Nippon Paper Industries Co., Ltd., Tokyo (JP); DIC Corporation, Tokyo (JP)

( * ) Notice: Subject to any disclaimer, the term of this patent is extended or adjusted under 35 U.S.C. 154(b) by 268 days.

(21) Appl. No.: 12/737,562

(22) PCT Filed: Feb. 2, 2009

(86) PCT No.: PCT/JP2009/051693
§ 371 (c)(1),
(2), (4) Date: Jan. 26, 2011

(87) PCT Pub. No.: WO2010/013502
PCT Pub. Date: Feb. 4, 2010

(65) Prior Publication Data
US 2011/0263756 A1    Oct. 27, 2011

(30) Foreign Application Priority Data

Jul. 31, 2008  (JP) ................. 2008-198224
Jul. 31, 2008  (JP) ................. 2008-198288

(51) Int. Cl.
| C08K 11/00 | (2006.01) |
| C08L 89/00 | (2006.01) |
| C08L 97/02 | (2006.01) |
| B29C 47/00 | (2006.01) |
| C08J 5/04  | (2006.01) |

(52) U.S. Cl.
CPC .............. C08J 5/045 (2013.01); C08J 2367/06 (2013.01)
USPC ..................... 524/9; 524/13; 524/14

(58) Field of Classification Search
USPC ................................. 524/9, 13, 14
See application file for complete search history.

(56) References Cited

U.S. PATENT DOCUMENTS

| 4,439,561 | A | * | 3/1984 | Barber ............................. 524/13 |
| 5,338,405 | A | * | 8/1994 | Patt et al. ......................... 162/25 |
| 5,998,026 | A | * | 12/1999 | Ramachandran ............... 428/372 |
| 6,103,790 | A | * | 8/2000 | Cavaille et al. ................. 524/13 |
| 6,248,267 | B1 | * | 6/2001 | Hosako et al. .................. 264/11 |
| 6,432,532 | B2 | * | 8/2002 | Perez et al. .................... 428/359 |
| 6,527,987 | B1 | * | 3/2003 | Yabuki et al. ................... 264/28 |
| 6,630,231 | B2 | * | 10/2003 | Perez et al. ................. 428/297.4 |
| 7,378,149 | B2 | | 5/2008 | Yano et al. |
| 7,455,901 | B2 | | 11/2008 | Yano et al. |
| 7,691,473 | B2 | | 4/2010 | Yano et al. |
| 7,727,356 | B2 | * | 6/2010 | Amma et al. ............... 162/157.3 |
| 8,012,312 | B2 | * | 9/2011 | Goto et al. .................... 162/231 |
| 8,012,573 | B2 | * | 9/2011 | Kowata et al. ............. 428/292.1 |
| 8,030,375 | B2 | * | 10/2011 | Yano et al. .................... 523/200 |
| 2001/0031594 | A1 | * | 10/2001 | Perez et al. ................... 442/339 |
| 2003/0091754 | A1 | * | 5/2003 | Chihani et al. ................ 427/580 |
| 2003/0109603 | A1 | * | 6/2003 | Drzal et al. ................... 523/400 |
| 2004/0018358 | A1 | * | 1/2004 | Rieder et al. .................. 428/373 |
| 2004/0145078 | A1 | * | 7/2004 | Merkley et al. ............... 264/236 |
| 2004/0254286 | A1 | * | 12/2004 | Hansen et al. ................ 524/500 |
| 2005/0067730 | A1 | | 3/2005 | Yano et al. |
| 2005/0284595 | A1 | * | 12/2005 | Conley et al. ................. 162/146 |
| 2006/0182941 | A1 | | 8/2006 | Yano et al. |
| 2007/0137818 | A1 | * | 6/2007 | Levit et al. ................... 162/146 |
| 2008/0075900 | A1 | * | 3/2008 | Hepworth et al. ........... 428/35.6 |
| 2008/0146701 | A1 | * | 6/2008 | Sain et al. ....................... 524/9 |
| 2008/0154225 | A1 | * | 6/2008 | Phan ............................. 604/367 |
| 2009/0054552 | A1 | | 2/2009 | Yano et al. |
| 2009/0065164 | A1 | * | 3/2009 | Goto et al. .................... 162/231 |
| 2009/0065975 | A1 | * | 3/2009 | Sain et al. ..................... 264/258 |
| 2009/0123726 | A1 | | 5/2009 | Yano et al. |
| 2009/0145842 | A1 | * | 6/2009 | Frances ........................ 210/505 |
| 2009/0221812 | A1 | * | 9/2009 | Ankerfors et al. ............. 536/56 |
| 2009/0264036 | A1 | | 10/2009 | Yano et al. |
| 2009/0298976 | A1 | | 12/2009 | Yano et al. |
| 2009/0305033 | A1 | * | 12/2009 | Yano et al. .................... 428/339 |
| 2009/0308552 | A1 | * | 12/2009 | Yano et al. ................. 162/164.3 |
| 2010/0172533 | A1 | * | 7/2010 | Kajihara et al. .............. 381/398 |
| 2011/0117319 | A1 | * | 5/2011 | Yano et al. .................... 428/141 |
| 2012/0214911 | A1 | * | 8/2012 | Yano et al. ..................... 524/13 |

FOREIGN PATENT DOCUMENTS

| EP | 0908541 A1 | 4/1999 |
| JP | 09-124950 A | 5/1997 |
| JP | 2003-201695 A | 7/2003 |
| JP | 2004143401 A | 5/2004 |

(Continued)

OTHER PUBLICATIONS

Lu et al., Polymer 49 (2008) 1285-1296.*
International Search Report dated Apr. 28, 2009, issued for PCT/JP2009/051693.
Supplementary European Search Report dated Jan. 4, 2013 for the European patent application No. 0980 2747.7.

*Primary Examiner* — Liam J Heincer

(74) *Attorney, Agent, or Firm* — Edwards Wildman Palmer LLP; James E. Armstrong, IV; Nicholas J. DiCeglie, Jr.

(57) ABSTRACT

The present invention relates to a molding material comprising an unsaturated polyester resin and microfibrillated plant fibers, the microfibrillated plant fibers comprising cellulose and hemicellulose, and having a specific surface area of 5 to 20 m$^2$/g; a method of producing the molding material; a molded article obtained by curing the molding material; and a method of producing an unsaturated polyester resin molded article comprising microfibrillated plant fibers.

8 Claims, No Drawings

(56) References Cited

FOREIGN PATENT DOCUMENTS

| | | |
|---|---|---|
| JP | 2005-042283 A | 2/2005 |
| JP | 2005-060680 A | 3/2005 |
| JP | 2006-035647 A | 2/2006 |
| JP | 2006-036926 A | 2/2006 |
| JP | 2006-240295 A | 9/2006 |
| JP | 2006-241450 A | 9/2006 |
| JP | 2006-312281 A | 11/2006 |
| JP | 2006-312688 A | 11/2006 |
| JP | 2006-316253 A | 11/2006 |
| JP | 2007-051266 A | 3/2007 |
| JP | 2007-146143 A | 6/2007 |
| JP | 2008-013621 A | 1/2008 |
| JP | 2008-024788 A | 2/2008 |
| JP | 2008-024795 A | 2/2008 |
| WO | WO-9310172 A1 | 5/1993 |
| WO | WO-2008/010464 A1 | 1/2008 |

* cited by examiner

MOLDING MATERIAL CONTAINING UNSATURATED POLYESTER RESIN AND MICROFIBRILLATED PLANT FIBER

TECHNICAL FIELD

The present invention relates to a molding material comprising an unsaturated polyester resin and microfibrillated plant fibers.

BACKGROUND ART

For the purpose of imparting heat resistance, functional strength, and other properties to thermosetting resins, powdery or fibrous reinforcers are used. Particularly, as fibrous reinforcers, fibers such as glass fibers, carbon fibers, ceramic fibers, silicon carbide fibers, metal fibers, and boron fibers; whiskers of metal, ceramic, polymer compounds, etc.; plant fibers such as pulp; synthetic fibers; etc., are generally used. Among plant fibers, microfibrillated cellulose has recently attracted attention.

Microfibrillated cellulose is a general term for fibrous celluloses having a microscale fiber diameter, and pulp as well as various plants, microorganisms, etc. are used as starting materials from which microfibrillated celluloses are derived. Depending on the type of starting materials and the process (e.g., mechanical processing and chemical processing), there are various forms of microfibrillated celluloses. As specific examples of the use of such microfibrillated celluloses as fibrous reinforcers in thermosetting resins, there are known cases in which microfibrillated celluloses are mixed with a phenolic resin or a bisphenol A-type epoxy resin.

For example, an outer plate member and a sliding member obtained by mixing and stirring 20 wt. % of microfibrillated cellulose "Celish" (Daicel Chemical Industries, Ltd.) and 80 wt. % of phenolic resin, and molding the mixture are known (see Patent Documents 1 and 2). The "Celish" is a microfibrillated cellulose having an average fiber diameter of 3 μm or less (0.01 to 3 μm), an average fiber length of 5 to 3,000 μm, and a specific surface area of 50 to 300 $m^2/g$, obtained by vigorously beating and microfabricating cotton linters etc. (starting materials for the microfibrillated cellulose) by the action of high shearing and high impact forces (Patent Document 3).

In addition to "Celish", a composite obtained by impregnating a nonwoven fabric comprising microfibrillated cellulose having a maximum fiber diameter of 1,500 nm or less with a bisphenol A-type epoxy resin, and thermally curing the resultant by a hot press is known (Patent Document 4). In order to maintain the transparency of a bisphenol A-type epoxy resin to be mixed with the microfibrillated cellulose, the microfibrillated cellulose is prepared by subjecting cotton linters to microfabrication about 20 times using a microfabrication apparatus such as a high-pressure homogenizer and an ultra-high pressure homogenizer.

On the other hand, Yano et al., who are inventors of the present invention, have produced a composite by laminating sheets prepared from a cellulose microfibril suspension, and impregnating them with a phenolic resin, followed by heating and pressurization in a mold (Patent Document 5).

Further, for the purpose of obtaining highly transparent members, Yano et al. have produced (1) resin composite sheets by impregnating sheet-like materials of microfibrillated cellulose derived from bacterial cellulose (BC) with a phenolic resin, followed by air drying for several hours, and laminating a required number of the sheets, followed by heat curing by hot pressing (Patent Documents 6 to 8). Moreover, Yano et al. have produced (2) resin composite sheets by impregnating sheet-like materials of BC-derived microfibrillated cellulose or pulp-derived microfibrillated cellulose with a monomer liquid of UV-curable acrylic resin (TCDDMA), followed by UV curing (Patent Documents 9 to 11). Furthermore, Yano et al. have produced (3) a composite resin composition comprising a bisphenol A-type epoxy resin and BC-derived microfibrillated cellulose or pulp-derived microfibrillated cellulose, the composition being cured for use as an adhesive or a sealant (Patent Document 12).

All of these documents intend to obtain highly transparent resin composite materials. Therefore, they are characterized by using BC originally having a small fiber diameter, or fibrillated cellulose having a nano-order fiber diameter and having a high specific surface area obtained by treating pulp with a high-pressure homogenizer, and then with a grinder 30 times.

Additionally, Yano et al. have produced a resin composite sheet by impregnating a sheet-like material of microfibrillated cellulose obtained by delignification/dehemicellulose in an aqueous potassium hydroxide solution with a monomer liquid of UV-curable acrylic resin (TCDDMA), followed by UV cross-linking (Patent Document 13).

On the other hand, unsaturated polyester resin molding materials obtained by adding fillers, curing agents, mold lubricants, pigments, thickeners, etc., to unsaturated polyester resins to obtain resin compositions; impregnating the resin compositions with reinforcing fiber substances, such as glass fiber; and forming the compositions into sheet- or bulk-like compositions are called sheet molding compounds (SMC), bulk molding compounds (BMC), etc., which are widely used in housing equipment, industrial components, and automobile components mainly after compression molding.

These molding materials are generally subjected to compression molding under heating. However, compression molding of larger-size products or more various kinds of products has drawbacks in that the cost burden, including securing of large-size molding machines, expensive mold investment, etc., is significantly increased. Generally, the compression molding temperature is about 120 to 160° C., and the compression molding pressure is as high as about 8 to 10 MPa. If compression molding can be carried out at low temperature and low pressure, the above cost burden can be reduced. However, compression molding at low temperature and low pressure results in underfills, and causes drawbacks in that cavities and pinholes are easily formed on the surface of the resulting molded products. Cavities and pinholes are undesirable because they impair the appearance of the molded products, and also have adverse effects on the mechanical strength of the molded products.

Moreover, microfibrillated plant fibers are known to have mechanical strength after being mixed with a phenolic resin or an epoxy resin. However, high molding pressure (several tens of MPa) was generally necessary to mold phenolic resin molding materials and epoxy resin molding materials comprising microfibrillated plant fibers. Furthermore, there was a problem that when two or more sheet-like resin materials comprising microfibrillated plant fibers were laminated and compressed into one molded article, the sheet-like resin materials were not integrated into one molded article at low pressure.

Patent Document 1: Japanese Unexamined Patent Publication No. 2006-312281

Patent Document 2: Japanese Unexamined Patent Publication No. 2006-312688

Patent Document 3: Japanese Unexamined Patent Publication No. 9-124950

Patent Document 4: Japanese Unexamined Patent Publication No. 2006-316253
Patent Document 5: Japanese Unexamined Patent Publication No. 2003-201695
Patent Document 6: Japanese Unexamined Patent Publication No. 2005-60680
Patent Document 7: Japanese Unexamined Patent Publication No. 2006-35647
Patent Document 8: Japanese Unexamined Patent Publication No. 2006-36926
Patent Document 9: Japanese Unexamined Patent Publication No. 2006-240295
Patent Document 10: Japanese Unexamined Patent Publication No. 2006-241450
Patent Document 11: Japanese Unexamined Patent Publication No. 2007-51266
Patent Document 12: Japanese Unexamined Patent Publication No. 2007-146143
Patent Document 13: Japanese Unexamined Patent Publication No. 2008-24788
Patent Document 14: Japanese Unexamined Patent Publication No. 2005-42283
Patent Document 15: Japanese Unexamined Patent Publication No. 2008-13621

DISCLOSURE OF THE INVENTION

Problems to be Solved by the Invention

As described above, as specific examples of the use of microfibrillated celluloses as fibrous reinforcers in thermosetting resins or UV cross-linking resins, microfibrillated celluloses were only known to be mixed with a phenolic resin, a bisphenol A-type epoxy resin, and TCDDMA (tricyclodecane diacrylate); however, an example of mixing microfibrillated cellulose with an unsaturated polyester resin was not specifically known.

Generally, when curable resins (e.g., phenolic resins) are cured by the addition of a fibrous reinforcer, in order to enhance impregnation properties, the resins are thermally fused and impregnated with the fibrous reinforcer, followed by curing; or a resin solution prepared by dissolving the resins in a solvent is impregnated with the fibrous reinforcer, and the solvent is evaporated, followed by curing. However, these methods cannot be used because unsaturated polyester resins are liquid resins.

Moreover, unsaturated polyester resins cannot be pressured (e.g., hydrostatic pressure) because when they are subjected to heating and compression molding in a mold, the resins in a liquid form flow during the mold clamping operation. Accordingly, resins poorly compatible with microfibrillated cellulose lead to problems specific to unsaturated polyester in that biased molding pressure makes uniform molding difficult, and mechanical strength is reduced.

Originally, highly hydrophobic unsaturated polyester resins are less compatible with highly hydrophilic microfibrillated celluloses. Thus, it was not clear whether unsaturated polyester resins were highly compatible with the microfibrillated celluloses of Patent Documents 1 to 13 when they were simply mixed. Consequently, it was not clear whether molding materials having excellent moldability were obtained by mixing the microfibrillated celluloses of Patent Documents 1 to 13 with unsaturated polyester resins, and whether the obtained molded bodies had excellent mechanical strength. Actually, molding materials having excellent moldability were not always obtained from the microfibrillated celluloses of Patent Documents 1 to 13; and consequently, molded bodies having excellent mechanical strength were not obtained.

Accordingly, an object of a first embodiment of the present invention is to provide an unsaturated polyester molding material that can impart excellent moldability to an unsaturated polyester resin, and also impart excellent mechanical strength to a molded article obtained from the molding material; a molded article obtained by molding the molding material; and a method of producing the molding material.

Further, as described above, molding phenolic resin molding materials and epoxy resin molding materials comprising microfibrillated plant fibers generally requires high temperature and high molding pressure (several tens of MPa). Compression molding at low temperature and low pressure results in underfills, and causes drawbacks in that cavities and pinholes are easily formed on the surface of the molded products. Cavities and pinholes problematically impair the appearance of the molded products, and also have adverse effects on the mechanical strength of the molded products.

Accordingly, an object of a second embodiment of the present invention is to provide a method of producing an unsaturated polyester resin molded article comprising microfibrillated plant fibers at a low molding pressure.

Means for Solving the Problems

The present inventors conducted extensive research for achieving the above objects, and found that in order to provide a molding material that can impart excellent moldability to an unsaturated polyester resin, and also impart excellent mechanical strength to a molded article obtained from the molding material, it is important to use plant fibers that are microfibrillated (hereafter referred to as the "microfibrillated plant fibers") and contain hemicellulose, and to control the specific surface area of the microfibrillated plant fibers within a specific range. Further, the molded article obtained by the production method of the present invention has excellent mechanical strength. The first embodiment of the present invention was accomplished upon further studies based on these findings. That is, the first embodiment of the present invention provides a molding material, a method of producing the molding material, and a molded article obtained by curing the molding material according to the following Items 1 to 7.

Item 1. A molding material comprising an unsaturated polyester resin and microfibrillated plant fibers, wherein the microfibrillated plant fibers comprise cellulose and hemicellulose, and have a specific surface area of 5 to 20 $m^2/g$.

Item 2. The molding material according to Item 1, wherein the hemicellulose content is 5 to 30 wt. % based on the total amount of hemicellulose and cellulose.

Item 3. The molding material according to Item 1 or 2, wherein the unsaturated polyester resin content in the molding material is 3 to 95 wt. %.

Item 4. The molding material according to any one of Items 1 to 3, wherein the microfibrillated plant fibers are obtained by defibrating a cellulose fiber-containing material comprising hemicellulose.

Item 5. A molded article obtained by curing the molding material according to any one of Items 1 to 4.

Item 6. A method of producing a molding material comprising an unsaturated polyester resin and microfibrillated plant fibers, wherein the method comprises mixing an unsaturated polyester resin and microfibrillated plant fibers comprising cellulose and hemicellulose and having a specific surface area of 5 to 20 $m^2/g$.

Item 7. A method of producing a molding material comprising an unsaturated polyester resin and microfibrillated plant fibers, wherein the method comprises impregnating microfibrillated plant fibers comprising cellulose and hemicellulose and having a specific surface area of 5 to 20 m²/g, with an unsaturated polyester resin.

Additionally, the present inventors found that an unsaturated polyester resin molded article comprising microfibrillated plant fibers can be obtained even at a low molding pressure by compressing and curing a molding material comprising microfibrillated plant fibers and an unsaturated polyester resin. The second embodiment of the present invention was accomplished upon further studies based on these findings. That is, the second embodiment of the present invention provides a method of producing an unsaturated polyester resin molded article according to Items 8 to 12.

Item 8. A method of producing an unsaturated polyester resin molded article, wherein the method comprises compression-molding a molding material comprising an unsaturated polyester resin and fibrillated plant fibers at a pressure of 0.1 to 100 MPa.

Item 9. The method according to Item 8, wherein the unsaturated polyester resin content in the molding material is 3 to 95 wt. %.

Item 10. The method according to Item 8 or 9, wherein the fibrillated plant fibers have a specific surface area of 5 to 20 m²/g.

Item 11. The method according to any one of Items 8 to 10, wherein the fibrillated plant fibers comprise cellulose and hemicellulose.

Item 12. The method according to any one of Items 8 to 11, wherein the hemicellulose content is 5 to 30 wt. % based on the total amount of hemicellulose and cellulose.

The first and second embodiments of the present invention are described in detail below.

I. First Embodiment (I-1) Molding Material

In the first embodiment of the present invention, the molding material comprises an unsaturated polyester resin and microfibrillated plant fibers, wherein the microfibrillated plant fiber contains hemicellulose and has a specific surface area of 5 to 20 m²/g.

The microfibrillated plant fibers used in the first embodiment of the present invention comprise hemicellulose. The hemicellulose content of the microfibrillated plant fiber is not particularly limited, insofar as the effect of the present invention is not adversely affected. It is generally satisfactory that the presence of hemicellulose in the fiber is confirmed; however, the lower limit of the hemicellulose content of the microfibrillated plant fiber based on the total content of hemicellulose and cellulose is preferably about 5 wt. %, more preferably about 8 wt. %, and even more preferably about 11 wt. %, while the upper limit is preferably about 30 wt. %, more preferably about 20 wt. %, and even more preferably about 17 wt. %.

The type of hemicellulose present in the microfibrillated plant fiber is not particularly limited, and specific examples thereof include polysaccharides such as glucomannan, glucuronoxylan, and arabinoglucuronoxylan.

The microfibrillated plant fiber used in the first embodiment of the present invention is obtained by defibrating a cellulose fiber-containing material comprising hemicellulose. Methods of controlling the hemicellulose content cannot be generalized because it depends on the type of the starting material (i.e., cellulose fiber-containing material), and the application, processing method, etc., of the molding material; however, the hemicellulose content can, for example, be reduced by treating a cellulose fiber-containing material with an alkali solution, or can be controlled within the aforementioned range by adding a solution containing hemicellulose (e.g., an alkaline extract of plant fiber) to microfibrillated plant fibers, depending on the purpose. From the viewpoint of productivity, microfibrillated plant fibers obtained by defibrating a cellulose fiber-containing material having a hemicellulose content within the aforementioned range are preferably used.

The alkali solution treatment can be carried out by a known method using sodium hydroxide, potassium hydroxide, aqueous ammonia, and other alkalis within a range where the cellulose crystal form is not changed. For example, when sodium hydroxide is used, the alkali solution treatment may be performed at a concentration of about 10% or less, and preferably 3 to 5%, at room temperature or below for 12 to 24 hours so that the hemicellulose content of the microfibrillated plant fiber is controlled within the above range.

Hemicellulose is associated with cellulose through hydrogen bonds to form cell walls in plants. In a molded article comprising microfibrillated plant fibers and an unsaturated polyester resin, hemicellulose can, due to its hydrogen bonding ability, reinforce the bond strength between fibers of the fibrillated plant fiber assembly. Consequently, hemicellulose presumably contributes to the improvement in strength of the molded article. Therefore, the presence of hemicellulose in the microfibrillated plant fiber is preferred.

When the hemicellulose content of the microfibrillated plant fiber is low, the resin ratio in the molded article (the content of the unsaturated polyester resin in the molding material) tends to increase. On the other hand, when the hemicellulose content is high, the resin ratio in the molded article tends to decrease. Accordingly, it is preferable to control the hemicellulose content of the microfibrillated plant fiber within the above range, because impregnation of the microfibrillated plant fiber with the unsaturated polyester is improved, the optimal range of resin ratio is obtained, and composite properties and moldability are thereby enhanced; consequently, molded bodies having more excellent mechanical strength can be obtained. The value of the hemicellulose content can be suitably determined within the above range depending on the mechanical properties etc. that are required for the molded article.

As the cellulose fiber-containing material, commonly used materials can be used as long as they contain hemicellulose. Examples thereof include plant raw materials, specifically, wood, bamboo, hemp, jute, kenaf, cotton, beet, agricultural waste, cloth, and pulp obtained from these plant raw materials. Particularly, pulp is preferably used as a starting material.

Preferable examples of the pulp include chemical pulp (kraft pulp (KP) and sulfite pulp (SP)), semi-chemical pulp (SCP), semi-ground pulp (CGP), chemi-mechanical pulp (CMP), ground pulp (GP), refiner mechanical pulp (RMP), thermomechanical pulp (TMP), and chemi-thermomechanical pulp (CTMP), which are obtained by chemically and/or mechanically pulping plant raw materials; and deinked recycled pulp, cardboard recycled pulp, and magazine recycled pulp, which comprise these plant fibers as main ingredients. These raw materials may optionally be subjected to delignification or bleaching to control the lignin content in the plant fibers. Delignification or bleaching may be performed before or after defibration.

Among these pulps, microfibrillated plant fibers produced by defibrating various kraft pulps derived from softwood with high fiber strength (softwood unbleached kraft pulp (hereafter sometimes referred to as NUKP), oxygen-prebleached softwood kraft pulp (hereafter sometimes referred to as NOKP), and softwood bleached kraft pulp (hereafter sometimes referred to as NBKP) are particularly preferably used.

The microfibrillated plant fibers used in the first embodiment of the present invention are preferably obtained by defibrating pulp having a hemicellulose content within the above preferred range.

The hemicellulose content of the microfibrillated plant fiber is represented as a content ratio (wt. %) that expresses the hemicellulose content (weight) in the total amount (weight) of hemicellulose and cellulose in the microfibrillated plant fiber as a percentage.

The lower limit of the specific surface area of the microfibrillated plant fibers used in the first embodiment of the present invention is 5 m$^2$/g, preferably 7 m$^2$/g, and more preferably 9 m$^2$/g; while the upper limit is 20 m$^2$/g, preferably 18 m$^2$/g, and more preferably 16 m$^2$/g.

When the specific surface area of the microfibrillated plant fibers is within the above range, many entanglements and hydrogen bonds occur between the plant fibers, as the specific surface area becomes large. Consequently, molded bodies having high strength are expected to be obtained. However, when the specific surface area is larger than 20 m$^2$/g, the resulting molded bodies have lower strength, and fail to achieve desired mechanical strength because of interfacial peeling occurring in the molded bodies. For example, when the molding material is obtained by impregnation, a large amount of time is required for dehydration and drying in order to obtain an assembly of the fibrillating plant fibers prior to obtaining a composite material with the resin. Thus, productivity and moldability may be reduced. Additionally, when the specific surface area is larger than 20 m$^2$/g, the resulting molded bodies may have lower mechanical strength, even if they have an appropriate resin ratio.

On the other hand, when the specific surface area is less than 5 m$^2$/g (for example, when an undefibrated cellulose fiber-containing material is used), the content of the resin in the molded article (resin ratio) is high, and the molded article tends to have low mechanical strength. Therefore, it is necessary to control the specific surface area of the microfibrillated plant fibers within a range of 5 to 20 m$^2$/g. When the specific surface area is within this range, molded bodies having excellent mechanical strength can be obtained. Especially, with a specific surface area of about 7 to 18 m$^2$/g, and particularly about 9 to 16 m$^2$/g, molded bodies having particularly excellent mechanical strength can be obtained. The value of the specific surface area may be suitably determined within the above range depending on the desired mechanical properties, and other properties required for the molded bodies.

The specific surface area of the microfibrillated plant fibers is preferably determined within the above range by suitably controlling the starting material, i.e., a hemicellulose fiber-containing material, by a commonly used defibration method. For example, the cellulose fiber-containing material is defibrated in such a manner that the cellulose fiber-containing material is suspended in water and stirred to obtain a slurry, and the slurry is mechanically ground or beaten using a refiner, a high-pressure homogenizer, a grinder, a twin-screw kneader, or the like for defibration. Such defibration methods are preferably combined, as required; for example, the twin-screw kneader treatment is performed after the refiner treatment.

As described above, the microfibrillated plant fibers may be obtained by treating a cellulose fiber-containing material with alkali solutions, such as an aqueous alkali hydroxide solution and aqueous ammonia. When the alkali treatment is carried out, the microfibrillated plant fibers may be obtained by forming a cellulose fiber-containing material into, for example, a powder, fibrous, or sheet-like form that allows efficient alkali solution treatment using a refiner etc., followed by the alkali solution treatment, and subjecting the treated material to defibration using a twin-screw kneader etc.; or may be obtained by carrying out the alkali solution treatment after the defibration treatment using a refiner, a high-pressure homogenizer, a grinder, a twin-screw kneader, etc.

The microfibrillated plant fibers of the first embodiment of the present invention are generally obtained by dispersing microfibrillated plant fibers in water to produce an aqueous dispersion, followed by dehydration (e.g., filtration and compression), drying, and other processes. Further, the molding material of the present invention is generally obtained by mixing the microfibrillated plant fibers with a resin. Therefore, the specific surface area of the fibers used in the present invention is measured using samples prepared by drying an aqueous dispersion of the microfibrillated plant fibers and by the BET method using N$_2$ gas, as described in the Examples to follow. More specifically, distilled water is added to the microfibrillated plant fibers to a solids content of 10 wt. %, and the resulting mixture is freeze-dried. Then, drying is carried out under heating at 100° C. for 30 minutes (pretreatment), and the surface area of the fibers is measured by the BET one-point method (mixed gas (N$_2$: 30%, He: 70%)) to determine the specific surface area of the fibers.

The fiber diameter of the microfibrillated plant fibers used in the first embodiment of the present invention is not particularly limited, as long as the effect of the present invention can be obtained. For example, the average fiber diameter is preferably 4 nm to 400 nm, more preferably 4 nm to 200 nm, and even more preferably 4 nm to 100 nm. The fiber length is also not particularly limited, as long as the effect of the present invention can be obtained. For example, the average fiber length is preferably 50 nm to 50 μm, and more preferably 100 nm to 10 μm.

The microfibrillated plant fibers used in the first embodiment of the present invention are generally in the form of a fiber assembly, which is a coherent bundle of fibers or fibrous materials that have been entangled by defibration. The size of the assembly itself is not particularly limited, and assemblies of various sizes can be used.

The lignin content in the microfibrillated plant fiber is generally about 2 to 70 wt. %, and preferably about 5 to 70 wt. %. Because the unsaturated polyester resin is a hydrophobic resin, it may be preferable in terms of resin impregnation properties etc. that the surface of the microfibrillated plant fiber is coated with hydrophobic lignin. The lignin content in the microfibrillated plant fiber is measured by the method described in the Examples to follow.

The unsaturated polyester resin used in the first embodiment of the present invention may be a generally used unsaturated polyester resin, and is obtained by polycondensation of polyhydric alcohols and dibasic acids containing unsaturated dibasic acid (e.g., α,β-unsaturated dibasic acid etc.). The unsaturated polyester resin is a liquid resin in which unsaturated polyester having an ester bond and an unsaturated bond in its main chain is dissolved in a vinyl monomer having cross-linking ability. In the present invention, the unsaturated polyester resin may further contain commonly used additives such as polymerization inhibitors, curing accelerators, and cross-linking agents. The unsaturated polyester resin can be cured, for example, by adding a curing agent thereto, followed by heating.

Examples of the α,β-unsaturated dibasic acid used in the preparation of the unsaturated polyester resin include maleic acid, maleic anhydride, fumaric acid, itaconic acid, itaconic acid anhydride, and the like. Examples of the saturated dibasic acid include phthalic acid, phthalic anhydride, halogenated phthalic anhydride, isophthalic acid, terephthalic acid, tetrahydrophthalic acid, tetrahydrophthalic anhydride, hexahydrophthalic acid, hexahydrophthalic anhydride, hexahydroterephthalic acid, hexahydroisophthalic acid, succinic acid, malonic acid, glutaric acid, adipic acid, sebacic acid, 1,12-dodecanedioic acid, 2,6-naphthalenedicarboxylic acid, 2,7-naphthalenedicarboxylic acid, 2,3-naphthalenedicarboxylic acid, 2,3-naphthalenedicarboxylic anhydride, 4,4'-biphenyldicarboxylic acid, and dialkyl esters thereof. These may be used singly or in a combination of two or more.

Examples of polyhydric alcohols include ethylene glycol, diethylene glycol, triethylene glycol, polyethylene glycol, propylene glycol, dipropylene glycol, polypropylene glycol, 2-methyl-1,3-propanediol, 1,3-butanediol, neopentyl glycol, hydrogenated bisphenol A, 1,4-butanediol, adducts of bisphenol A with propylene oxide or ethylene oxide, 1,2,3,4-tetrahydroxybutane, glycerin, trimethylolpropane, 1,3-propanediol, 1,2-cyclohexane glycol, 1,3-cyclohexane glycol, 1,4-cyclohexane glycol, 1,4-cyclohexanedimethanol, paraxylene glycol, bicyclohexyl-4,4'-diol, 2,6-decalin glycol, 2,7-decalin glycol, and the like. These may be used singly or in a combination of two or more.

Examples of vinyl monomers include styrene, vinyl toluene, chlorostyrene, diallyl phthalate, triallyl cyanurate, methyl methacrylate, etc. These may be used singly or in a combination of two or more.

Examples of polymerization inhibitors include trihydrobenzene, toluhydroquinone, 14-naphthoquinone, parabenzoquinone, hydroquinone, benzoquinone, hydroquinone monomethyl ether, p-tert-butyl catechol, 2,6-di-tert-butyl-4-methylphenol, etc. When used the polymerization inhibitor, these polymerization inhibitor is preferably added to the resin composition in an amount of about 10 to 1,000 ppm. These may be used singly or in a combination of two or more.

Examples of curing accelerators include metal soaps such as cobalt naphthenate, cobalt octylate, zinc octylate, vanadium octylate, copper naphthenate, and barium naphthenate; metal chelates such as vanadium acetylacetate, cobalt acetylacetate, and iron acetylacetonate; amines such as N,N-substituted anilines such as aniline, N,N-dimethylaniline, N,N-diethylaniline, p-toluidine, N,N-dimethyl-p-toluidine, N,N-bis(2-hydroxyethyl)-p-toluidine, 4-(N,N-dimethylamino) benzaldehyde, 4-[N,N-bis(2-hydroxyethyl)amino] benzaldehyde, 4-(N-methyl-N-hydroxyethylamino) benzaldehyde, N,N-bis(2-hydroxypropyl)-p-toluidine, N-ethyl-m-toluidine, triethanolamine, m-toluidine, diethylenetriamine, N,N-dimethylacetoacetamide, dimethylpyridine, phenylmorpholine, piperidine, N,N-bis(hydroxyethyl) aniline, diethanolaniline, and N,N-substituted-p-toluidines; and 4-(N,N-substituted amino)benzaldehyde. In the present invention, amine-based and metal soap-based curing accelerators are preferred. These curing accelerators may be used in a combination of two or more, and may be previously added to the resin or may be added before use.

Examples of cross-linking agents include polyfunctional vinyl monomers such as divinylbenzene, and polyfunctional (meth)acrylate, other than the above-described vinyl monomers. These may be used singly or in a combination of two or more.

The unsaturated polyester resin used in the first embodiment of the present invention may be further mixed with various additives such as curing agents, waxes, mold lubricants, UV absorbers, pigments, age inhibitors, plasticizers, flame retardants, stabilizers, defoaming agents, leveling agents, and silane coupling agents.

Organic peroxide can be used as the curing agent, and specific examples thereof include methyl ethyl ketone peroxide, acetylacetone peroxide, cyclohexanone peroxide, benzoyl peroxide, and other known and conventional organic peroxides. The amount of the curing agent added is preferably about 0.5 to 3 parts by weight based on the total amount (100 parts by weight) of the unsaturated polyester resin.

Examples of waxes include paraffin wax, polyethylene wax, and higher fatty acids such as stearic acid and 1,2-hydroxy stearic acid; preferably, paraffin wax is used.

Examples of pigments include inorganic pigments such as titanium white and carbon black, and organic pigments such as phthalocyanine blue and quinacridone red. Various colorants can be used depending on the color phase.

The molding material of the first embodiment of the present invention comprises the unsaturated polyester resin and the fibrillation plant fibers as essential components. The unsaturated polyester resin content in the molding material (resin ratio) is generally about 3 to 95 wt. %, and preferably about 10 to 90 wt. %. The resin ratio may be suitably adjusted depending on the application of the molded article, while keeping a balance between the required mechanical strength and other general characteristics.

The molding material of the first embodiment of the present invention may optionally contain other components, in addition to the unsaturated polyester resin and fibrillation plant fibers. Examples of other components include polymerization inhibitors, curing accelerators, curing agents, and various additives, as described above, as well as polysaccharides such as starch and alginic acid; natural proteins such as gelatin, glue, and casein; inorganic compounds such as ceramics and metal powder, colorants, plasticizers, flavoring agents, pigments, flow controlling agents, leveling agents, conducting agents, antistatic agents, UV absorbers, UV light dispersants, deodorizers, etc.

(I-2) Method of Producing Molding Material

The method of the first embodiment of the present invention for producing a molding material comprising an unsaturated polyester resin and microfibrillated plant fibers comprises mixing an unsaturated polyester resin with microfibrillated plant fibers containing cellulose and hemicellulose, and having a specific surface area of 5 to 20 $m^2/g$.

The molding material of the first embodiment of the present invention can be obtained by mixing the unsaturated polyester resin, the fibrillation plant fibers, and optionally added other components. The method of mixing these components is not particularly limited. For example, an assembly of the fibrillating plant fibers may be impregnated with the unsaturated polyester resin; alternatively, the fibrillated plant fiber assembly and the unsaturated polyester resin may be kneaded.

The form of the fibrillated plant fiber assembly is not particularly limited. For example, the fiber assembly may be formed into a sheet-like material by filtering a dispersion of the fibrillated plant fibers through a wire, mesh, or the like, followed by drying; a film-like material by applying the dispersion to a wire base, followed by drying; a mold-like material by placing the dispersion in a mold etc., followed by dehydration by pressing or heating; and a powder material by pulverizing them. Alternatively, as long as productivity, energy consumption etc., are not adversely affected, the fibrillated plant fiber assembly may be obtained by washing the fibrillated plant fiber assembly in a moisture state, which is an earlier form of the above fibrillated plant fiber assembly, several times with a solvent, followed by drying; or obtained by freeze-drying the fiber assembly in a moisture state.

For example, a sheet-like molding material can be obtained by impregnating a sheet-like material of the fibrillating plant fibers with the unsaturated polyester resin and optionally other components.

When the fibrillated plant fiber assembly is formed into a sheet-like material, the thickness of the fiber assembly is generally about 10 to 500 μm, and preferably about 50 to 300 μm. An overly thin sheet-like material may result in a decrease in strength etc.; whereas an overly thick sheet-like material may require longer time to be combined with the resin.

The impregnation method may be suitably selected depending on the form of the fibrillated plant fiber assembly, etc. For example, the fibrillated plant fiber assembly is immersed in the unsaturated polyester resin. The immersion is performed under normal or reduced pressure.

When the molding material is in the form of a sheet, a required number of sheets can be used in the form of a laminate. The thickness of the sheet-like molding material may be suitably adjusted depending on the application of the target molded article, and is not particularly limited; however, it is generally about 10 μm to 10 cm.

It is preferable to use microfibrillated plant fibers comprising hemicellulose and having a specific surface area within the above range in the impregnation of the fibrillated plant fiber assembly with the unsaturated polyester resin and optionally other components, because the degree of impregnation of the fibrillated plant fiber assembly (particularly in the form of a sheet) with the unsaturated polyester resin is satisfactory, moldability is excellent, and a molded article having excellent mechanical strength can be obtained by curing the molding material.

The form of the molding material of the first embodiment of the present invention may be suitably determined depending on the ease of molding and processing, the form, mechanical strength, and other properties of the target molded article, etc.

(I-3) Molded Article

The molded article of the first embodiment of the present invention can be obtained by curing the molding material. The molding material can be cured by using any methods similar to general methods of molding thermoplastic resin compositions. For example, mold molding, injection molding, extrusion molding, blow molding, foam molding, etc., can be used. The molded article of the present invention is preferably obtained by curing the molding material by heating and compression.

When the molding material is cured by heating and compression, heating temperature and pressure may be suitably determined depending on the composition, form, etc., of the molding material. The heating temperature for curing the molding material is generally about 60 to 150° C., and preferably about 80 to 130° C.

The pressure during curing the molding material is about 0.1 to 100 MPa, preferably about 0.2 to 10 MPa, and more preferably about 0.5 to 5 MPa. Heating and compression time may be suitably determined depending on the heating temperature, pressure, etc., and is generally about 3 minutes to 10 hours.

When the molding material is in the form of a sheet, for example, a method of curing the sheet-like molding material placed in a mold by heating and compression can be adopted. Two or more sheet-like molding materials can be laminated, and heated and compressed to obtain one molded article.

The resin ratio of the molded article (the proportion of the unsaturated polyester resin in the molded article) of the first embodiment of the present invention can be suitably determined by controlling the molding conditions, such as pressing pressure and pressing time in the production of the molding material; or by adjusting the hemicellulose content of the microfibrillated plant fiber and the specific surface area of the microfibrillated plant fiber within the above range. Generally, the resin ratio is about 3 to 95 wt. %, and preferably about 10 to 90 wt. %.

The density of the molded article of the first embodiment of the present invention varies depending on, for example, the type of microfibrillated plant fiber, unsaturated polyester resin, and other materials used, and the proportion thereof; however, it is generally about 1.0 to 1.5 g/cm$^3$. The density, flexural modulus, and flexural strength of the molded article of the present invention are measured by the methods described in the Examples.

The molded article obtained in the first embodiment of the present invention, which has high mechanical strength, can be used, for example, in fields where microfibrillated plant fiber molded bodies and microfibrillated plant fiber-containing resin molded bodies are conventionally used, as well as in fields where higher mechanical strength (e.g., impact resistance) than those of conventional microfibrillated plant fiber molded bodies and microfibrillated plant fiber-containing resin molded bodies is required. For example, the molded article can be effectively used in interior materials, exterior materials, structural materials, etc., of transport equipment such as automobiles, trains, ships, and airplanes; housings, structural materials, internal components, etc., of electric appliances such as personal computers, televisions, telephones, and clocks; housings, structural materials, internal components, etc., of mobile communication devices such as mobile phones; housings, structural materials, internal components, etc., of portable music reproduction devices, image reproduction devices, printing presses, copying machines, sports equipment, etc.; building materials; office supplies such as stationeries, and the like.

II. Second Embodiment

Next, the second embodiment of the present invention is described in detail. The method of the second embodiment of the present invention for producing an unsaturated polyester resin molded article comprises compression molding a molding material comprising an unsaturated polyester resin and fibrillated plant fibers at a pressure of 0.1 to 100 MPa.

(II-1) Molding Material

The molding material of the second embodiment of the present invention comprises an unsaturated polyester resin and microfibrillated plant fibers.

The method of producing microfibrillated cellulose is known. Generally, microfibrillated cellulose is produced by defibration or refining by grinding and/or beating a cellulose fiber-containing material using a refiner, a high-pressure homogenizer, a medium stirring mill, a stone mill, a grinder, or the like. A method described in Japanese Unexamined Patent Publication No. 2005-42283, and other known methods, can also be used. Microfibrillated cellulose can also be produced by using microorganisms (e.g., acetic acid bacteria (acetobacter)). Additionally, "Celish" (Daicel Chemical Industries, Ltd.) and other commercial products can be used.

Known cellulose fiber-containing materials originate from plants (e.g., wood, bamboo, hemp, jute, kenaf, agricultural waste, cloth, pulp, regenerated pulp, and used paper), animals (e.g., Ascidiacea), algae, microorganisms (e.g., acetic acid bacteria (acetobacter)), microorganism products, etc.

For example, the cellulose fiber-containing material is defibrated in such a manner that the cellulose fiber-containing material is suspended in water and stirred to obtain a slurry, and the slurry is treated by a high-pressure homogenizer, a twin-screw kneader, or the like for defibration. The refiner treatment may be performed before the defibration treatment with a high-pressure homogenizer, a twin-screw kneader, etc., as required.

The microfibrillated plant fibers may also be obtained by treating a cellulose fiber-containing material with alkali solutions, such as an aqueous alkali hydroxide solution and aqueous ammonia. When the alkali treatment is carried out, the microfibrillated plant fibers may be obtained by forming a cellulose fiber-containing material into, for example, a powder, fibrous, or sheet-like form that allows efficient alkali solution treatment, using a refiner etc., followed by the alkali solution treatment, and grinding and/or beating the treated material using a high-pressure homogenizer, a twin-screw kneader, a medium stirring mill, a stone mill, a grinder, etc.; or may be obtained by carrying out the defibration treatment by grinding and/or beating using a high-pressure homogenizer, a twin-screw kneader, a medium stirring mill, a stone mill, a grinder, etc., after the refiner treatment, followed by the alkali solution treatment.

The fiber diameter of the microfibrillated plant fibers used in the second embodiment of the present invention is not particularly limited, as long as the effect of the present invention can be obtained. For example, the average fiber diameter is preferably 4 nm to 400 nm, more preferably 4 nm to 200 nm, and even more preferably 4 nm to 100 nm. The fiber length is also not particularly limited, as long as the effect of the present invention can be obtained. For example, the average fiber length is preferably 50 nm to 50 µm, and more preferably 100 nm to 10 µm.

The microfibrillated plant fibers used in the second embodiment of the present invention are generally in the form of a fiber assembly, which is a coherent bundle of fibers or fibrous materials that have been entangled by defibration. The size of the assembly itself is not particularly limited, and assemblies of various sizes can be used.

However, when molded bodies having excellent mechanical strength are produced at low temperature and lower molding pressure in the production method according to the second embodiment of the present invention, it is preferable to use microfibrillated plant fibers comprising hemicellulose and having a specific surface area of 5 to 20 $m^2/g$.

The microfibrillated plant fibers preferably used in the second embodiment of the present invention comprise hemicellulose. The hemicellulose content of the microfibrillated plant fiber is not particularly limited, insofar as the effect of the present invention is not adversely affected. It is generally satisfactory that the presence of hemicellulose in the fiber is confirmed; however, the lower limit of the hemicellulose content is preferably about 5 wt. %, more preferably about 8 wt. %, and even more preferably about 11 wt. %; while the upper limit is preferably about 30 wt. %, more preferably about 20 wt. %, and even more preferably about 17 wt. %.

The type of hemicellulose present in the microfibrillated plant fiber is not particularly limited, and specific examples thereof include polysaccharides such as glucomannan, glucuronoxylan, and arabinoglucuronoxylan. Methods of controlling the hemicellulose content cannot be generalized because it depends on the type of the starting material (i.e., cellulose fiber-containing material), and the application, processing method, etc., of the molding material; however, the hemicellulose content can, for example, be reduced by treating a cellulose fiber-containing material with an alkali solution, or can be controlled within the aforementioned range by adding a solution containing hemicellulose (e.g., an alkaline extract of plant fiber) to microfibrillated plant fibers, depending on the purpose. From the viewpoint of productivity, microfibrillated plant fibers obtained by defibrating a cellulose fiber-containing material having a hemicellulose content within the aforementioned range are preferably used.

The alkali solution treatment can be carried out by a known method using sodium hydroxide, potassium hydroxide, aqueous ammonia, and other alkalis, within a range where the cellulose crystal form is not changed. For example, when sodium hydroxide is used, the alkali solution treatment may be performed at a concentration of about 10% or less, and preferably 3 to 5%, at room temperature or below for 12 to 24 hours so that the hemicellulose content of the microfibrillated plant fiber is controlled within the above range.

As described above, hemicellulose is associated with cellulose through hydrogen bonds to form cell walls in plants. In a molded article comprising microfibrillated plant fibers and an unsaturated polyester resin, hemicellulose can, due to its hydrogen bonding ability, reinforce the bond strength between fibers of the fibrillated plant fiber assembly. Consequently, hemicellulose presumably contributes to the improvement in strength of the molded article. Therefore, the presence of hemicellulose in the microfibrillated plant fiber is preferred.

When the hemicellulose content of the microfibrillated plant fiber is low, the resin ratio in the molded article (the content of the unsaturated polyester resin in the molding material) tends to increase. On the other hand, when the hemicellulose content is high, the resin ratio in the molded article tends to decrease. Accordingly, it is preferable to control the hemicellulose content of the microfibrillated plant fiber within the above range, because impregnation of the microfibrillated plant fiber with the unsaturated polyester is improved, the optimal range of resin ratio is obtained, and composite properties and moldability are thereby enhanced; consequently, molded bodies having more excellent mechanical strength can be obtained. The value of the hemicellulose content can be suitably determined within the above range depending on the mechanical properties etc. that are required for the molded article.

As the cellulose fiber-containing material, commonly used materials can be used, as long as they contain hemicellulose. Examples thereof include plant raw materials, specifically, wood, bamboo, hemp, jute, kenaf, cotton, beet, agricultural waste, cloth, and pulp obtained from these plant raw materials. Particularly, pulp is preferably used as a starting material. Preferable examples of the pulp include chemical pulp (kraft pulp (KP) and sulfite pulp (SP)), semi-chemical pulp (SCP), semi-ground pulp (CGP), chemi-mechanical pulp (CMP), ground pulp (GP), refiner mechanical pulp (RMP), thermomechanical pulp (TMP), and chemi-thermomechanical pulp (CTMP), which are obtained by chemically and/or mechanically pulping plant raw materials; and deinked recycled pulp, cardboard recycled pulp, and magazine recycled pulp, which comprise these plant fibers as main ingredients.

These starting materials may optionally be subjected to delignification or bleaching to control the lignin content in the plant fibers. Delignification or bleaching may be performed before or after defibration.

Among these pulps, microfibrillated plant fibers produced by defibrating various kraft pulps derived from softwood with high fiber strength (softwood unbleached kraft pulp (hereafter sometimes referred to as NUKP), oxygen-prebleached softwood kraft pulp (hereafter sometimes referred to as NOKP), and softwood bleached kraft pulp (hereafter sometimes referred to as NBKP) are particularly preferably used.

The microfibrillated plant fibers used in the second embodiment of the present invention are preferably obtained by defibrating pulp having a hemicellulose content within the above preferred range.

The hemicellulose content of the microfibrillated plant fiber is represented by a content ratio (wt. %) that expresses the hemicellulose content (weight) in the total amount (weight) of hemicellulose and cellulose in the microfibrillated plant fiber as a percentage.

The lower limit of the specific surface area of the microfibrillated plant fibers used in the second embodiment of the present invention is generally 5 $m^2/g$, preferably 7 $m^2/g$, and more preferably 9 $m^2/g$; while the upper limit is 20 $m^2/g$, preferably 18 $m^2/g$, and more preferably 16 $m^2/g$.

When the specific surface area of the microfibrillated plant fibers is within the above range, many entanglements and hydrogen bonds occur between the plant fibers, as the specific surface area becomes large. Consequently, molded bodies having high strength are expected to be obtained. However, when the specific surface area is larger than 20 $m^2/g$, the resulting molded bodies have lower strength, and fail to achieve desired mechanical strength because of interfacial peeling occurring in the molded bodies. For example, when the molding material is obtained by impregnation, a large amount of time is required for dehydration and drying in order to obtain an assembly of the fibrillating plant fibers prior to obtaining a composite material with the resin. Thus, productivity and moldability may be reduced. Additionally, when the specific surface area is larger than 20 $m^2/g$, the resulting molded bodies may have lower mechanical strength, even if they have an appropriate resin ratio.

On the other hand, when the specific surface area is less than 5 $m^2/g$ (for example, when an undefibrated cellulose fiber-containing material is used), the content of the resin in the molded article (resin ratio) is high, and the molded article tends to have low mechanical strength. Therefore, it is preferable from the viewpoint of mechanical strength to control the specific surface area of the microfibrillated plant fibers within a range of 5 to 20 $m^2/g$. When the specific surface area is within this range, molded bodies having excellent mechanical strength can be obtained. Especially, with a specific surface area of 7 to 18 $m^2/g$, and particularly 9 to 16 $m^2/g$, molded bodies having particularly excellent mechanical strength can be obtained. The value of the specific surface area may be suitably determined within the above range depending on the desired mechanical properties, and other properties required for the molded bodies.

The specific surface area of the microfibrillated plant fibers is preferably determined within the above range by suitably controlling the starting material, i.e., a hemicellulose fiber-containing material, by a commonly used defibration method. For example, the cellulose fiber-containing material is defibrated in such a manner that the cellulose fiber-containing material is suspended in water and stirred to obtain a slurry, and the slurry is mechanically ground or beaten using a refiner, a high-pressure homogenizer, a grinder, a twin-screw kneader, or the like for defibration. Such defibration methods are preferably combined, as required; the twin-screw kneader treatment is performed after the refiner treatment.

As described above, the microfibrillated plant fibers may be obtained by treating a cellulose fiber-containing material with alkali solutions, such as an aqueous alkali hydroxide solution and aqueous ammonia. When the alkali treatment is carried out, the microfibrillated plant fibers may be obtained by forming a cellulose fiber-containing material into, for example, a powder, fibrous, or sheet-like form that allows efficient alkali solution treatment using a refiner etc., followed by the alkali solution treatment, and subjecting the treated material to defibration using a twin-screw kneader etc.; or may be obtained by carrying out the alkali solution treatment after the defibration treatment using a refiner, a high-pressure homogenizer, a grinder, a twin-screw kneader, etc.

The microfibrillated plant fibers of the second embodiment of the present invention are generally obtained by dispersing microfibrillated plant fibers in water to produce an aqueous dispersion, followed by dehydration (e.g., filtration and compression), drying, and other processes. Further, the molding material of the present invention is generally obtained by mixing the microfibrillated plant fibers with a resin. Therefore, the specific surface area of the fibers used in the present invention is measured using samples prepared by drying an aqueous dispersion of the microfibrillated plant fibers and by the BET method using $N_2$ gas, as described in the Examples to follow. More specifically, distilled water is added to the microfibrillated plant fibers to a solids content of 10 wt. %, and the resulting mixture is freeze-dried. Then, drying is carried out under heating at 100° C. for 30 minutes (pretreatment), and the surface area of the fibers is measured by the BET one-point method (mixed gas ($N_2$: 30%, He: 70%)) to determine the specific surface area of the fibers.

The lignin content in the microfibrillated plant fiber is generally about 2 to 70 wt. %, and preferably about 5 to 70 wt. %. Because the unsaturated polyester resin is a hydrophobic resin, it may be preferable in terms of resin impregnation properties etc. that the surface of the microfibrillated plant fiber is coated with hydrophobic lignin. The lignin content in the microfibrillated plant fiber is measured by the method described in the Examples to follow.

Examples of the unsaturated polyester resin used in the second embodiment of the present invention are the same as the unsaturated polyester resins used in the first embodiment, and are obtained by the same preparation method.

The unsaturated polyester resin used in the second embodiment of the present invention may be further mixed with various additives similar to those used in the first embodiment, such as curing agents, waxes, mold lubricants, UV absorbers, pigments, age inhibitors, plasticizers, flame retardants, stabilizers, defoaming agents, leveling agents, and silane coupling agents.

The molding material used in the second embodiment of the present invention comprises the unsaturated polyester resin and the fibrillation plant fibers as essential components. The unsaturated polyester resin content in the molding material (resin ratio) is generally about 3 to 95 wt. %, and preferably about 10 to 90 wt. %. The resin ratio may be suitably adjusted depending on the application of the molded article, while keeping a balance between the required mechanical strength and other general characteristics.

As in the first embodiment, the molding material used in the second embodiment of the present invention may optionally contain other components, in addition to the unsaturated polyester resin and fibrillation plant fibers. Examples of other components are the same as those used in the first embodiment.

(II-2) Method of Producing Molding Material

The molding material used in the second embodiment of the present invention can be obtained by mixing the unsaturated polyester resin, the fibrillation plant fibers, and optionally added other components. The method of mixing these components is not particularly limited. For example, an assembly of the fibrillating plant fibers may be impregnated with the unsaturated polyester resin; alternatively, the fibrillated plant fiber assembly and the unsaturated polyester resin may be kneaded.

The form of the fibrillated plant fiber assembly is not particularly limited. For example, the fiber assembly may be formed into a sheet-like material by filtering a dispersion of the fibrillating plant fibers through a wire, mesh, or the like, followed by drying; a film-like material by applying the dispersion to a wire base, followed by drying; a mold-like material by placing the dispersion in a mold etc., followed by dehydration by pressing or heating; and a powder material by pulverizing them. Alternatively, within a range in which productivity, energy consumption etc., are not adversely affected, the fibrillated plant fiber assembly may be obtained by washing the fibrillated plant fiber assembly in a moisture state, which is an earlier form of the above fibrillated plant fiber assembly, several times with a solvent, followed by drying; or obtained by freeze-drying the fiber assembly in a moisture state.

For example, a sheet-like molding material can be obtained by impregnating a sheet-like material of the fibrillating plant fibers with the unsaturated polyester resin and optionally other components.

When the fiber assembly of the fibrillated plant fibers is formed into a sheet-like material, the thickness of the fiber assembly is generally about 10 to 500 μm, and preferably about 50 to 300 μm. An overly thin sheet-like material may result in a decrease in strength etc.; whereas an overly thick sheet-like material may require longer time to be combined with the resin.

The impregnation method may be suitably selected depending on the form of the fibrillated plant fiber assembly, etc. For example, the fibrillated plant fiber assembly is immersed in the unsaturated polyester resin. The immersion is performed under normal or reduced pressure.

When the molding material is in the form of a sheet, a required number of sheets can be used in the form of a laminate. The thickness of the sheet-like molding material may be suitably adjusted depending on the application of the target molded article, and is not particularly limited; however, it is generally about 10 μm to 10 cm.

It is preferable to use microfibrillated plant fibers comprising hemicellulose and having a specific surface area within the above range in the impregnation of the fibrillated plant fiber assembly with the unsaturated polyester resin and optionally other components, because the degree of impregnation of the fibrillated plant fiber assembly (particularly in the form of a sheet) with the unsaturated polyester resin is satisfactory, moldability is excellent, and a molded article having excellent mechanical strength can be obtained by curing the molding material.

The form of the molding material used in the present invention may be suitably determined depending on the ease of molding and processing, the form, mechanical strength, and other properties of the target molded article, etc.

(II-3) Molded Article

The molded article used in the second embodiment of the present invention can be obtained by curing the molding material. The molding material can be cured by using any methods similar to general methods of molding thermoplastic resin compositions. For example, mold molding, injection molding, extrusion molding, blow molding, foam molding, etc., can be used. The molded article of the present invention is preferably obtained by curing the molding material by heating and compression.

When the molding material is cured by heating and compression, heating temperature and pressure may be suitably determined depending on the composition, form, etc., of the molding material. The heating temperature for curing the molding material is generally about 60 to 150° C., and preferably about 80 to 130° C.

The pressure during curing the molding material is about 0.1 to 100 MPa, preferably about 0.2 to 10 MPa, and more preferably about 0.5 to 5 MPa. Heating and compression time may be suitably determined depending on the heating temperature, pressure, etc., and is generally about 3 minutes to 10 hours.

When the molding material is in the form of a sheet, for example, a method of curing the sheet-like molding material placed in a mold by heating and compression can be adopted. Two or more sheet-like molding materials can be laminated, and heated and compressed to obtain one molded article.

The resin ratio of the molded article (the proportion of the unsaturated polyester resin in the molded article) of the second embodiment of the present invention can be suitably determined by controlling the molding conditions, such as pressing pressure and pressing time in the production of the molding material; or by adjusting the hemicellulose content of the microfibrillated plant fiber and the specific surface area of the microfibrillated plant fiber within the above range. Generally, the resin ratio is about 3 to 95 wt. %, and preferably about 10 to 90 wt. %.

The density of the molded article of the second embodiment of the present invention varies depending on, for example, the type of microfibrillated plant fiber, unsaturated polyester resin, and other materials used, and the proportion thereof; however, it is generally about 1.0 to 1.5 $g/cm^3$. The density, flexural modulus, and flexural strength of the molded article are measured by the methods described in the Examples.

The molded article obtained in the second embodiment of the present invention, which has high mechanical strength, can be used, for example, in fields where microfibrillated plant fiber molded bodies and microfibrillated plant fiber-containing resin molded bodies are conventionally used, as well as in fields where higher mechanical strength (e.g., impact resistance) than those of conventional microfibrillated plant fiber molded bodies and microfibrillated plant fiber-containing resin molded bodies is required. For example, the molded article can be effectively used in interior materials, exterior materials, structural materials, etc., of transport equipment such as automobiles, trains, ships, and airplanes; housings, structural materials, internal components, etc., of electric appliances such as personal computers, televisions, telephones, and clocks; housings, structural materials, internal components, etc., of mobile communication devices such as mobile phones; housings, structural materials, internal components, etc., of portable music reproduction devices, image reproduction devices, printing presses, copying machines, sports equipment, etc.; building materials; office supplies such as stationeries, and the like.

Effect of the Invention

According to the first embodiment of the present invention, the unsaturated polyester molding material of the present invention allows homogeneous molding by mixing the microfibrillated plant fibers of the present invention with an unsaturated polyester resin, and can consequently impart excellent mechanical strength to the obtained molded article. Moreover, the unsaturated polyester molding material can be produced by the method of producing the molding material.

Generally, molding resin materials comprising microfibrillated plant fibers necessitates high pressure (several tens of MPa); however, according to the production method of the second embodiment of the present invention using microfibrillated plant fibers and an unsaturated polyester resin, desired molded bodies can be obtained from sheet-like molding materials even at low temperature and low molding pressure. Particularly, the method has an excellent effect in that desired molded bodies can be obtained from sheet-like molding materials even at low molding pressure, when two or more sheet-like molding materials are laminated and compressed into one molded article. The molded article obtained by the production method of the present invention can be effectively used in fields in which high mechanical strength is required.

BEST MODE FOR CARRYING OUT THE INVENTION

The present invention is described in more detail below with reference to Examples of the first and second embodiments of the present invention; however, the present invention is not limited thereto.

I. First Embodiment

Production Example I-1

NUKP; Refiner Treatment×4 times+Twin-Screw Kneader Defiberization

Papermaking softwood unbleached kraft pulp (NUKP, manufactured by Oji Paper Co., Ltd.) was suspended in water and sufficiently stirred to obtain a 4 wt. % slurry. The slurry was treated four times by a refiner, followed by filtration to adjust the pulp density to 20 wt. %. The resultant was then placed in a twin-screw kneader for defibration (processing speed: 120 g/h) under the following conditions, thereby obtaining microfibrillated plant fibers (1) (MFPF (1)). When the obtained microfibrillated plant fibers (1) were observed by a scanning electron microscope (SEM), nanofibrillated fibers having a fiber diameter of tens of nm were observed.
Twin-Screw Kneader
  Twin-screw extruder manufactured by Technovel Corporation
  Screw diameter: 15 mm
  Screw length/screw diameter ratio: 45
  Screw rotation speed: 400 rpm Production Example I-2

NUKP; Refiner Treatment×1 Time+Twin-Screw Kneader Defiberization

Microfibrillated plant fibers (2) were obtained in the same manner as in Production Example I-1, except that the refiner treatment was performed only once.

Production Example I-3

NOKP; Refiner Treatment×4 Times+Twin-Screw Kneader Defiberization

Microfibrillated plant fibers (3) were obtained in the same manner as in Production Example I-1, except that papermaking oxygen-prebleached softwood kraft pulp (NOKP) (manufactured by Oji Paper Co., Ltd.) was used in place of the papermaking softwood unbleached kraft pulp (NUKP).

Production Example I-4

NBKP (High Hemicellulose Content); Refiner Treatment×4 times+Twin-Screw Kneader Defiberization Microfibrillated plant fibers (4) were obtained in the same manner as in Production Example I-1, except that papermaking softwood bleached kraft pulp ("NBKP"; manufactured by Oji Paper Co., Ltd.) was used in place of the papermaking softwood unbleached kraft pulp (NUKP).

Production Example I-5

NBKP (Low Hemicellulose Content); Refiner Treatment×4 Times+Twin-Screw Kneader Defiberization The microfibrillated plant fibers (4) (12 g) produced in Production Example I-4 were dispersed in 1.2 L of 3% aqueous sodium hydroxide solution, and the mixture was stirred at room temperature for 24 hours. After the completion of the reaction, suction filtration was carried out, and the residue was sufficiently dispersed in 1 L of distilled water. Then, the slurry was filtered again. This operation was repeated until the filtrate was completely neutral. After the filtrate was confirmed to be neutral, the filtrate was filtered again, thereby obtaining hemicellulose-free microfibrillated plant fibers (5).

Production Example I-6

NUKP; Refiner Treatment×4 Times, No Twin-Screw Kneader Defiberization

Papermaking NUKP was suspended in water and sufficiently stirred to obtain a 4 wt. % slurry. Subsequently, the refiner treatment was repeated four times to obtain microfibrillated plant fibers (6).

Reference Production Example I-1

Celish

Celish (KY100G (concentration: 10%), manufactured by Daicel Chemical Industries, Ltd.) was used as microfibrillated plant fibers (7).

Reference Production Example I-2

NUKP; Refiner Treatment×1 Time, No Twin-Screw Kneader Defiberization

Papermaking NUKP was suspended in water and sufficiently stirred to obtain a 4 wt. % slurry. Subsequently, the refiner treatment was performed once to obtain microfibrillated plant fibers (8).

Reference Production Example I-3

NBKP; Refiner Treatment×30 Times+High-Pressure Homogenizer Treatment

Papermaking NBKP was suspended in water and sufficiently stirred to obtain a 2 wt. % slurry. Subsequently, the refiner treatment was repeated 30 times. The treated material was then diluted to 0.5 wt. %, and the high-pressure homogenizer treatment was repeated 10 times at a treatment pressure of 120 MPa, thereby obtaining microfibrillated plant fibers (9).

Measurement Example I-1

Measurement of Specific Surface Area

Distilled water was added to each of the microfibrillated plant fibers (1) to (9) to a solids content of 10 wt. %, and the resulting mixtures were freeze-dried. The obtained freeze-dried samples were each supplied to measurement equipment after being chipped to a size sufficient for a sample cell. The measurement equipment used was a fluid-type specific surface area automatic measuring instrument FlowSorb II 2300 (manufactured by Micromeritics). The samples were placed in a sample cell, and drying was carried out at 100° C. for 30 minutes by introducing a mixed gas ($N_2$: 30%, He 70%) (pretreatment). Thereafter, the surface area of each sample was measured by the BET one-point method (mixed gas ($N_2$: 30%, He: 70%)). After measurement, the amount of the sample in the cell was precisely weighed to determine the specific surface area of the sample. Table 1 shows the results.

Measurement Example I-2

Measurement of Lignin Content

The lignin content in the microfibrillated plant fibers was measured by the Klason method (sulfuric acid method). More specifically, wood structural polysaccharides were made water-soluble by acidic hydrolysis, and lignin was separated as a water-insoluble substance by acid-catalyzed condensation polymerization, and then quantified. The following describes the measurement method in detail.

A 72% sulfuric acid (15 ml) was gradually added to 1,000 mg of each of the freeze-dried microfibrillated plant fibers (1) to (9), and heated at 20° C. for 2 hours. Thereafter, 560 ml of water was added thereto, and the mixture was heated in an autoclave at 120° C. for 1 hour. The obtained insoluble precipitate was filtered and weighed precisely. The lignin content (R) was determined by the following formula. Table 1 shows the results.

Lignin content (wt. %)=(insoluble precipitate weight (mg)/sample weight (mg))×100

Measurement Example I-3

Measurement of Hemicellulose Content

The alditol acetate method was applied. More specifically, the samples were subjected to acidic hydrolysis, and the isolated monosaccharides were reduced. The produced alditol was then acetylated, and quantified by gas chromatography. A more detailed description is provided below.

A 72% sulfuric acid (0.3 ml) was added to 30 mg of each of the freeze-dried microfibrillated plant fibers (1) to (9), and allowed to stand at 30° C. for 1 hour. Thereafter, 8.4 ml of water was added thereto, and the mixture was heated in an autoclave at 120° C. for 1 hour. Then, 0.5 ml of 2% inositol was added to the reaction mixture, and the pH of the reaction mixture was adjusted to 5.5 to 5.8 using a saturated aqueous $Ba(OH)_2$ solution. Subsequently, 2 ml of the supernatant was taken, and sodium borohydride ($NaBH_4$) was added to reduce monosaccharides in the aqueous solution, thereby obtaining alditol. Acetic anhydride (2 ml) and 0.1 ml of sulfuric acid were added to the produced alditol for acetylation, and quantitative analysis was carried out using a gas chromatograph (Shimadzu GC-18A, manufactured by Shimadzu Corporation). The total weight of galactoglucomannan and xylan was used as the hemicellulose weight to determine the hemicellulose content (H (wt. %)) in the total amount of cellulose, hemicellulose, and lignin in the microfibrillated plant fibers. Table 1 shows the results.

In Measurement Examples I-2 and I-3, the hemicellulose content (H' (wt. %)) in the total amount of hemicellulose and cellulose in the microfibrillated plant fibers was determined. However, the calculation was conducted on the assumption that the constituents of the microfibrillated plant fibers were cellulose, lignin, and hemicellulose. Table 1 shows the results.

TABLE 1

| | MFPF | Measurement Example I-1/ Specific surface area (m²/g) | Measurement Example I-2/ Lignin content R (wt. %) | Measurement Example I-3/ Hemicellulose content H (wt. %) | Hemicellulose content H' (wt. %) |
|---|---|---|---|---|---|
| Production Example I-1 | (1) | 11.0 | 6.0 | 14.8 | 15.4 |
| Production Example I-2 | (2) | 12.9 | 6.0 | 14.4 | 15.0 |
| Production Example I-3 | (3) | 9.1 | 0.8 | 16.2 | 16.3 |
| Production Example I-4 | (4) | 12.8 | 0 | 16.3 | 16.3 |
| Production Example I-5 | (5) | 14.0 | 0 | 11.7 | 11.7 |
| Production Example I-6 | (6) | 6.8 | 6.0 | 14.4 | 15.0 |
| Reference Production Example I-1 | (7) | 25.9 | 0 | 4.0 | 4.0 |
| Reference Production Example I-2 | (8) | 3.9 | 6.0 | 14.8 | 15.0 |
| Reference Production Example I-3 | (9) | 22.9 | 0 | 18.2 | 18.2 |

Examples I-1 to I-6 and Reference Examples I-1 to I-3

Production of MFPF Sheet-like Material and Resin-Impregnated Composite

Water was added to each of the microfibrillated plant fibers (1) to (9) to a solids content of 0.5 wt. %, and stirred with a mixer ("HX-V200", manufactured by Matsushita Electric Industrial Co., Ltd.) at a high speed for 5 minutes, thereby obtaining a microfibrillated plant fiber (MFPF) aqueous dispersion. Subsequently, the MFPF aqueous dispersion was dehydrated under reduced pressure at room temperature using a filter paper (5A, manufactured by Advantec MFS, Inc.) to prepare a round wet paper (radius: 8 cm) with a basis weight of 100 g/m$^2$. After the wet paper was sandwiched between dry filter papers, couch was carried out using a metal roller, and pre-dehydration was performed. The wet paper was then dried on a hot plate. MFPF sheet-like materials (1) to (9) were prepared in this manner.

The obtained MFPF sheet-like materials (1) to (9) were cut into pieces (width: 30 mm×length: 40 mm), and dried at 105° C. for 2 hours. The weight of each material was then measured. Thereafter, each MFPF sheet-like material was immersed in a resin solution prepared by adding 1 part by weight of benzoyl peroxide ("Nyper FF", manufactured by NOF Corporation) to 100 parts by weight of unsaturated polyester resin ("SUNDHOMA FG-283", manufactured by DH Material Inc.). The immersion was performed under reduced pressure (vacuum degree: 0.01 MPa, time: 0.5 h). Unsaturated polyester resin-impregnated MFPF sheet-like materials (1) to (9) were obtained in this manner. Subsequently, 12 sheets of each of the unsaturated polyester resin-impregnated MFPF sheet-like materials (1) to (9) were laminated. After the excessive resin was removed, each laminate was placed in a mold, and hot-pressed at 90° C. for 0.5 hours. Thus, MFPF-unsaturated polyester resin composite molded bodies (1) to (9) were obtained. The weight of the obtained molded bodies (1) to (9) was measured, and the resin ratio (wt. %) was determined from the difference between the measured weight of the molded bodies and the dry weight of the above-described MFPF sheet-like materials (1) to (9). Table 2 shows the measurement results.

Reference Example I-4

Production of Molded Article Only Comprising Unsaturated Polyester

An unsaturated polyester resin solution was placed alone in a mold, and hot-pressed in the same manner as in Examples I-1 to I-6 and Reference Examples I-1 to I-3, thereby obtaining a molded article (10). Table 2 shows the measurement results.

Test Example I-1

Measurement of Density

The length and width of the molded bodies (1) to (10) were accurately measured with a caliper (manufactured by Mitutoyo Corporation). Thicknesses at some portion of each molded article were measured by a micrometer (manufactured by Mitutoyo Corporation), and the volume of the molded article was calculated. Separately, the weight of the molded bodies was measured. The density of the molded bodies was determined from the measured weight and volume. Table 2 shows the results.

Test Example I-2

Measurement of Flexural Modulus and Flexural Strength

Samples (thickness: about 1.2 mm×width: 7 mm×length: 40 mm) were prepared from the molded bodies (1) to (10), and the flexural modulus and flexural strength of each sample were measured at a deformation rate of 5 mm/min (load cell: 5kN). The measurement equipment used was a universal testing machine Instron Model 3365 (manufactured by Instron Japan Co., Ltd.). Table 2 shows the results.

TABLE 2

| | | Condition | | Result | | | |
|---|---|---|---|---|---|---|---|
| Example | Molded article | Pressing pressure (MPa) | Impregnation time (h) | Resin ratio (wt. %) | Density (g/cm$^3$) | Flexural modulus (GPa) | Flexural strength (MPa) |
| Example I-1 | (1) | 5 | 0.5 | 10.9 | 1.43 | 12.0 ± 0.2 | 232 ± 3 |
| Example I-2 | (2) | 5 | 0.5 | 12.7 | 1.42 | 12.5 ± 0.1 | 255 ± 3 |
| Example I-3 | (3) | 5 | 0.5 | 11.8 | 1.42 | 11.8 ± 0.4 | 233 ± 6 |
| Example I-4 | (4) | 5 | 0.5 | 16.0 | 1.42 | 12.3 ± 0.2 | 249 ± 3 |
| Example I-5 | (5) | 5 | 0.5 | 22.2 | 1.40 | 11.1 ± 0.3 | 200 ± 50 |
| Example I-6 | (6) | 5 | 1.5 | 18.2 | 1.19 | 10.1 ± 0.3 | 140 ± 20 |
| Reference Example I-1 | (7) | 5 | 0.5 | 12.7 | 1.38 | 9.7 | 86.0 |
| Reference Example I-2 | (8) | 5 | 0.5 | 38.1 | 1.21 | 7.5 ± 0.2 | 148 ± 6 |
| Reference Example I-3 | (9) | 5 | 0.5 | 8.5 | 1.41 | Unmeasurable; interfacial peeling | Unmeasurable; interfacial peeling |
| Reference Example I-4 | (10) | 5 | — | 100 | 1.17 | 3.2 | 60.0 |

Production Example I-7

NUKP; Refiner Treatment×4 Times+Twin-Screw Kneader Defibration; Large Specific Surface Area Microfibrillated plant fibers (11) were obtained in the same manner as in Production Example I-1, except that defibration using a twin-screw kneader was continued until the specific surface area of the microfibrillated plant fibers (1) was 15.4 m²/g. The specific surface area and hemicellulose content of the fibers were determined in the same manner as in Measurement Examples I-1, I-2, and I-3. Table 3 shows the results.

TABLE 3

| | MFPF | Measurement Example I-1/ Specific surface area (m²/g) | Measurement Example I-2/ Lignin content R (wt. %) | Measurement Example I-3/ Hemicellulose content H (wt. %) | Hemicellulose content H' (wt. %) |
|---|---|---|---|---|---|
| Production Example I-7 | (7) | 15.4 | 6.0 | 14.8 | 15.4 |

Examples I-7 and I-8

Production of MFPF Sheet-Like Material and Resin-Impregnated Composite

Using the microfibrillated plant fibers (1) and (11) obtained in Production Examples I-1 and I-7, respectively, MFPF sheet-like materials (1') and (11) were produced in the same manner as in Examples I-1 to I-6. The obtained MFPF sheet-like materials were cut into pieces (width: 15 mm×length: 65 mm), and impregnated with a resin to produce unsaturated polyester resin-impregnated MFPF sheet-like materials (1') and (11). Then, 25 sheets of each material were laminated and hot-pressed. Except for these operations, the same procedure as in Example I-1 was conducted to produce MFPF-unsaturated polyester resin composite molded bodies (1') and (11). The density of each molded article was measured in the same manner as in Test Example I-1. Table 4 shows the results.

Test Example I-3

Measurement of Flexural Modulus and Flexural Strength

Samples (thickness: about 2 mm×width: 7 mm×length: 50 mm) were prepared from the molded bodies (1') and (11), and the flexural modulus and flexural strength of each sample were measured at a deformation rate of 5 mm/min (load cell: 5 kN). The measurement equipment used was a universal testing machine Instron Model 3365 (manufactured by Instron Japan Co., Ltd.). Table 4 shows the results.

TABLE 4

| Example | Molded article | Pressing pressure (MPa) | Impregnation time (h) | Resin ratio (wt. %) | Density (g/cm³) | Flexural modulus (GPa) | Flexural strength (MPa) |
|---|---|---|---|---|---|---|---|
| Example I-7 | (1') | 2 | 0.5 | 17.3 | 1.37 | 10.1 | 186 |
| Example I-8 | (11) | 2 | 0.5 | 13.2 | 1.37 | 11.4 | 201 |

The microfibrillated plant fibers of Examples I-1, I-2, I-6, and Reference Example I-2 were obtained by using plant fibers each containing the same amount of lignin (6 wt. %) as the starting materials. The comparison of these fibers demonstrates that the flexural strength and flexural modulus of the obtained molded article can be improved by increasing the specific surface area of the microfibrillated plant fibers within the above-described range. The strength of the obtained molded article was raised presumably because the increased specific surface area resulted in an increase in the interactions (e.g., hydrogen bond) between the microfibrillated plant fibers.

The microfibrillated plant fibers of Examples I-4 and I-5, and Reference Examples I-1 and I-3 were also obtained by using plant fibers having an lignin content of 0 wt. % as the starting materials. The specific surface area and hemicellulose content of the microfibrillated plant fibers differ from each other. The fibers of Reference Example I-3 having a high specific surface area as well as a high hemicellulose content were extremely poorly impregnated with the unsaturated polyester resin under the same molding conditions, failing to produce a molded article in which the resin was uniformly impregnated in the microfibrillated plant fiber assembly. Therefore, the flexural strength and flexural modulus of the obtained molded article were significantly inferior to other molded bodies. The fibers of Reference Example I-1 had a high specific surface area and a low hemicellulose content. A molded article was obtained when the hemicellulose content was low, regardless of the high specific surface area; however, the strength of the obtained molded article was significantly inferior to those of Examples I-4 and I-5. Further, the fibers of Examples I-4 and I-5 had equivalent specific surface areas; however, the molded article of Example I-5 had a lower hemicellulose content than that of Example I-4. As shown in Table 2, the molded article of Example I-4 was superior to the molded article of Example I-5 in both flexural strength and flexural modulus.

Hemicellulose is considered to promote interfiber bonding in microfibrillated plant fibers. When the hemicellulose content of the fiber is high, the interface bond strength between the unsaturated polyester resin and the microfibrillated plant fiber tends to be reduced, as in the case where the specific surface area of the fiber is too high. Consequently, the strength of the obtained molded article presumably tends to be lower. This indicates that in order to obtain resin molded bodies having high strength, it is necessary to control the specific surface area of microfibrillated plant fibers comprising hemicellulose within the aforementioned range. It also turns out that in order to obtain resin molded bodies having higher strength, it is necessary to control the specific surface area and hemicellulose content of microfibrillated plant fibers to be combined with a resin within the aforementioned range.

II. Second Embodiment

Production Example II-1

NUKP; Refiner Treatment×4 Times+Twin-Screw Kneader Defibration

Papermaking softwood unbleached kraft pulp (NUKP, manufactured by Oji Paper Co., Ltd.) was suspended in water and sufficiently stirred to obtain a 4 wt. % slurry. The slurry was treated four times by a refiner, followed by filtration to adjust the pulp density to 20 wt. %. The resultant was then placed in a twin-screw kneader for defibration (processing speed: 120 g/h) under the following conditions, thereby obtaining microfibrillated plant fibers (MFPF). When the obtained microfibrillated plant fibers were observed by a scanning electron microscope (SEM), nanofibrillated fibers having a fiber diameter of tens of nm were observed.

Twin-Screw Kneader

Twin-screw extruder manufactured by Technovel Corporation
 Screw diameter: 15 mm
 Screw length/screw diameter ratio: 45
 Screw rotation speed: 400 rpm Measurement Example II-1

Measurement of Specific Surface Area

Distilled water was added to the microfibrillated plant fiber to a solids content of 10 wt. %, and the resulting mixture was freeze-dried. The obtained freeze-dried sample was supplied to measurement equipment after being chipped to a size sufficient for a sample cell. The measurement equipment used was a fluid-type specific surface area automatic measuring instrument FlowSorb II 2300 (manufactured by Micromeritics). The sample was placed in a sample cell, and drying was carried out at 100° C. for 30 minutes by introducing a mixed gas ($N_2$: 30%, He 70%) (pretreatment). Thereafter, the surface area of the sample was measured by the BET one-point method (mixed gas ($N_2$: 30%, He: 70%)). After measurement, the amount of the sample in the cell was precisely weighed to determine the specific surface area of the sample. Table 5 shows the results.

Measurement Example II-2

Measurement of Lignin Content

The lignin content in the microfibrillated plant fibers was measured by the Klason method (sulfuric acid method). More specifically, wood structural polysaccharides were made water-soluble by acidic hydrolysis, and lignin was separated as a water-insoluble substance by acid-catalyzed condensation polymerization, and then quantified. The following describes the measurement method in detail.

A 72% sulfuric acid (15 ml) was gradually added to 1,000 mg of the freeze-dried microfibrillated plant fibers, and heated at 20° C. for 2 hours. Thereafter, 560 ml of water was added thereto, and the mixture was heated in an autoclave at 120° C. for 1 hour. The obtained insoluble precipitate was filtered and weighed precisely. The lignin content (R) was determined by the following formula. Table 5 shows the results.

Lignin content (wt. %)=(insoluble precipitate weight (mg)/sample weight (mg))×100

Measurement Example II-3

Measurement of Hemicellulose Content

The alditol acetate method was applied. More specifically, the sample was subjected to acidic hydrolysis, and the isolated monosaccharides were reduced. The produced alditol was then acetylated, and quantified by gas chromatography. A more detailed description is provided below.

A 72% sulfuric acid (0.3 ml) was added to 30 mg of the freeze-dried microfibrillated plant fibers, and allowed to stand at 30° C. for 1 hour. Thereafter, 8.4 ml of water was added thereto, and the mixture was heated in an autoclave at 120° C. for 1 hour. Then, 0.5 ml of 2% inositol was added to the reaction mixture, and the pH of the reaction mixture was adjusted to 5.5 to 5.8 using a saturated aqueous $Ba(OH)_2$ solution. Subsequently, 2 ml of the supernatant was taken, and sodium borohydride ($NaBH_4$) was added to reduce the monosaccharides in the aqueous solution, thereby obtaining alditol. Acetic anhydride (2 ml) and 0.1 ml of sulfuric acid were added to the produced alditol for acetylation, and quantitative analysis was carried out using a gas chromatograph (Shimadzu GC-18A, manufactured by Shimadzu Corporation). The total weight of galactoglucomannan and xylan was used as the hemicellulose weight to determine the hemicellulose content (H (wt. %)) in the total amount of cellulose, hemicellulose, and lignin contained in the microfibrillated plants fiber. Table 5 shows the results.

Based on Measurement Examples II-2 and II-3, the hemicellulose content (H' (wt. %)) in the total amount of hemicellulose and cellulose contained in the microfibrillated plant fiber was determined. However, the calculation was conducted on the assumption that the constituent in the microfibrillated plant fiber comprised cellulose, lignin, and hemicellulose. Table 5 shows the results.

TABLE 5

| | MFPF | Measurement Example II-1/ Specific surface area ($m^2$/g) | Measurement Example II-2/ Lignin content R (wt. %) | Measurement Example II-3/ Hemicellulose content H (wt. %) | Hemicellulose content H' (wt. %) |
|---|---|---|---|---|---|
| Production Example II-1 | (12) | 11.0 | 6.0 | 11.0 | 14.8 |

Example II-1

Production of MFPF Sheet-like Material and Unsaturated Polyester Resin-Impregnated Composite Water was added to the microfibrillated plant fibers to a solids content of 0.5 wt. %, and stirred with a mixer ("HX-V200", manufactured by Matsushita Electric Industrial Co., Ltd.) at a high speed for 5 minutes, thereby obtaining a microfibrillated plant fiber (MFPF) aqueous dispersion. Subsequently, the MFPF aqueous dispersion was dehydrated under reduced pressure at room temperature using a filter paper (5A, manufactured by Advantec MFS, Inc.) to prepare a round wet paper (radius: 8 cm) with a basis weight of 100 g/$m^2$. After the wet paper was sandwiched between dry filter papers, couch was carried out using metal rollers, and pre-dehydration was conducted. The wet paper was then dried on a hot plate. A MFPF sheet-like material was prepared in this manner.

The obtained MFPF sheet-like material was cut into pieces (width: 30 mm×length: 40 mm), and dried at 105° C. for 2 hours. The weight of the material was then measured. Thereafter, the MFPF sheet-like material was immersed in a resin solution prepared by adding 1 part by weight of benzoyl peroxide ("Nyper FF", manufactured by NOF Corporation) to 100 parts by weight of unsaturated polyester resin ("SUNDHOMA FG-283", manufactured by DH Material Inc.). The immersion was performed under reduced pressure (vacuum degree: 0.01 MPa, time: 0.5 h). An unsaturated polyester resin-impregnated MFPF sheet-like material was obtained in this manner. Subsequently, 12 sheets of the unsaturated polyester resin-impregnated MFPF sheet-like material were laminated. After the excessive resin was removed, the laminate was placed in a mold, and hot-pressed at the heating temperatures and for the heating times shown in Tables 6 to 9. Thus, a MFPF-unsaturated polyester resin composite molded article was obtained. The weight of the obtained molded article was measured, and the resin ratio (wt. %) was determined from the difference between the measured weight of the molded article and the dry weight of the above-described MFPF sheet-like material (Tables 6 to 9). In addition, the mechanical strength of the molded article was measured according to Test Example II-1 described below (Tables 6 to 9).

Reference Example II-1

Production of FRP Sheet-like Material (Unsaturated Polyester Resin and Glass Fiber)

A sheet-like molded article of a glass fiber-unsaturated polyester resin composite (FRP) was obtained in the same manner as in Example II-1, except that 25 to 30 wt. % of a sheet-like material composed of glass fibers ("PB-549", manufactured by Nitto Boseki Co., Ltd.) was used in place of the microfibrillated plant fiber sheet-like material. The resin ratio (wt. %) and mechanical strength of the obtained sheet-like material were measured in the same manner as in Example II-1 (Tables 6 to 9).

Reference Example II-2

Production of Unsaturated Polyester Resin Sheet-like Molded Article

Benzoyl peroxide (1 part by weight) was added to 100 parts by weight of unsaturated polyester resin. The mixture was placed in a mold, and hot-pressed at the heating temperatures and for the heating times shown in the table, as in Example II-1. Thus, a sheet-like molded article only comprising an unsaturated polyester resin was obtained. The resin ratio (wt. %) and mechanical strength of the obtained sheet-like molded article were measured in the same manner as in Example II-1 (Tables 6 to 9).

Reference Example II-3

Production of MFPF Sheet-like Material and Phenolic Resin-Impregnated Composite

A sheet-like molded article of the MFPF-phenolic resin composite was obtained in the same manner as in Example II-1, except that phenolic resin ("PL2340", manufactured by Gun Ei Chemical Industry Co., Ltd.) was used in place of the unsaturated polyester resin, and that the immersion time of the phenolic resin in the methanol solution was as shown in Tables 6 to 9. The resin ratio (wt. %) and mechanical strength of the obtained sheet-like molded article were measured in the same manner as in Example II-1 (Tables 6 to 9).

Test Example II-1

Measurement of Mechanical Strength (Flexural Modulus and Flexural Strength)

Samples (thickness: about 1.2 mm×width: 7 mm×length: 40 mm) were prepared from the molded bodies obtained in Test Example II-1 and Reference Examples II-1 to II-3, and the flexural modulus and flexural strength of each sample were measured at a deformation rate of 5 mm/min (load cell: 5 kN). The measurement equipment used was a universal testing machine Instron Model 3365 (manufactured by Instron Japan Co., Ltd.). Tables 6 to 9 show the results.

TABLE 6

| | Example of constant pressing pressure (0.2 MPa) and impregnation time | | | | | | |
|---|---|---|---|---|---|---|---|
| | Condition | | | Result | | | |
| Molded article | Pressing pressure (MPa) | Heating temperature (° C.) | Impregnation time (h) | Resin ratio (wt. %) | Density (g/cm³) | Flexural modulus (GPa) | Flexural strength (MPa) |
| Example II-1 | 0.2 | 90 | 0.5 | 17.1 | 1.39 | 11.3 ± 0.2 | 221 ± 3 |
| Reference Example II-1 | 0.2 | 90 | 0.5 | 73.0 | 1.34 | 5.4 | 115 |
| Reference Example II-2 | 0.2 | 90 | — | 100 | 1.17 | 3.5 | 72 |

TABLE 7

Example of constant pressing pressure (1.5 MPa) and impregnation time

| Molded article | Condition | | | Result | | | |
|---|---|---|---|---|---|---|---|
| | Pressing pressure (MPa) | Heating temperature (° C.) | Impregnation time (h) | Resin ratio (wt. %) | Density (g/cm³) | Flexural modulus (GPa) | Flexural strength (MPa) |
| Example II-1 | 1.5 | 90 | 0.5 | 12.4 | 1.42 | 11.9 ± 0.2 | 230 ± 4 |
| Reference Example II-1 | 1.5 | 90 | — | 100 | 1.17 | 3.6 | 75 |
| Reference Example II-2 | 1.5 | 90 | 0.5 | 13.3 | 1.37 | 11.1 | 188 |

TABLE 8

Example of constant pressing pressure (5 MPa) and impregnation time

| Molded article | Condition | | | Result | | | |
|---|---|---|---|---|---|---|---|
| | Pressing pressure (MPa) | Heating temperature (° C.) | Impregnation time (h) | Resin ratio (wt. %) | Density (g/m³) | Flexural modulus (GPa) | Flexural strength (MPa) |
| Example II-1 | 5 | 90 | 0.5 | 10.9 | 1.43 | 12.0 ± 0.2 | 232 ± 3 |
| Reference Example II-1 | 5 | 90 | 0.5 | 72.0 | 1.35 | 11.0 | 203 |
| Reference Example II-2 | 5 | 90 | — | 100 | 1.17 | 3.6 | 78 |

TABLE 9

Example of constant strength

| Molded article | Condition | | | Result | | | |
|---|---|---|---|---|---|---|---|
| | Pressing pressure (MPa) | Heating temperature (° C.) | Impregnation time | Resin ratio (wt. %) | Density (g/m³) | Flexural modulus (GPa) | Flexural strength (MPa) |
| Example II-1 | 0.2 | 90 | 0.5 | 17.1 | 1.39 | 11.3 ± 0.2 | 221 ± 3 |
| Reference Example II-1 | 5 | 90 | 0.5 | 10.9 | 1.43 | 12.0 ± 0.2 | 232 ± 3 |
| Reference Example II-2 | 5 | 90 | 12 | 9.1 | 1.28 | 112 ± 0.1 | 220 ± 20 |

INDUSTRIAL APPLICABILITY

The unsaturated polyester molding material of the first embodiment of the present invention allows homogeneous molding by mixing the microfibrillated plant fibers of the present invention with an unsaturated polyester resin, and can consequently impart excellent mechanical strength to the obtained molded article. Such a molded article can be effectively used in fields in which high mechanical strength is required. Moreover, the unsaturated polyester molding material can be produced by the method of producing the molding material.

Furthermore, according to the production method of the second embodiment of the present invention, desired molded bodies can be obtained from sheet-like molding materials even at low temperature and low molding pressure. Particularly, the method has an excellent effect in that desired molded bodies can be obtained from sheet-like molding materials even at low molding pressure, when two or more sheet-like molding materials are laminated and compressed into one molded article. The molded article obtained by the production method of the present invention can be effectively used in fields in which high mechanical strength is required.

The invention claimed is:

1. A molding material comprising an unsaturated polyester resin and microfibrillated plant fibers, wherein
   the microfibrillated plant fibers comprise cellulose and hemicellulose, and have a specific surface area of 9 to 20 m²/g, and
   the hemicellulose content of the microfibrillated plant fiber is about 11.7 wt. % to about 30 wt. % based on the total amount of hemicellulose and cellulose.

2. The molding material according to claim 1, wherein the unsaturated polyester resin content in the molding material is 3 to 95 wt. %.

3. The molding material according to claim 1, wherein the microfibrillated plant fibers are obtained by defibrating a cellulose fiber-containing material comprising hemicellulose.

4. A molded article obtained by curing the molding material according to claim 1.

5. A method of producing a molding material comprising an unsaturated polyester resin and microfibrillated plant fibers, wherein
  the method comprises mixing an unsaturated polyester resin and microfibrillated plant fibers comprising cellulose and hemicellulose and having a specific surface area of 9 to 20 m$^2$/g, and
  the hemicellulose content of the microfibrillated plant fiber is about 11.7 wt. % to about 30 wt. % based on the total amount of hemicellulose and cellulose.

6. A method of producing a molding material comprising an unsaturated polyester resin and microfibrillated plant fibers, wherein
  the method comprises impregnating a sheet-like material of microfibrillated plant fibers comprising cellulose and hemicellulose and having a specific surface area of 9 to 20 m$^2$/g, with an unsaturated polyester resin, and
  the hemicellulose content of the microfibrillated plant fiber is about 11.7 wt. % to about 30 wt. % based on the total amount of hemicellulose and cellulose.

7. A method of producing an unsaturated polyester resin molded article, wherein
  the method comprises compression-molding a molding material comprising an unsaturated polyester resin and fibrillated plant fibers at a pressure of 0.1 to 100 MPa,
  wherein the fibrillated plant fibers comprise cellulose and hemicellulose and having a specific surface area of 9 to 20 m$^2$/g, with an unsaturated polyester resin, and
  the hemicellulose content is about 11.7 wt. % to about 30 wt. % based on the total amount of hemicellulose and cellulose.

8. The method according to claim 7, wherein the unsaturated polyester resin content in the molding material is 3 to 95 wt. %.

* * * * *